US011379410B2

(12) United States Patent
Shergill et al.

(10) Patent No.: US 11,379,410 B2
(45) Date of Patent: Jul. 5, 2022

(54) AUTOMATED INFORMATION LIFECYCLE MANAGEMENT OF INDEXES

(71) Applicant: ORACLE INTERNATIONAL CORPORATION, Redwood Shores, CA (US)

(72) Inventors: Kamaljit Shergill, Maidenhead (GB); Hariharan Lakshmanan, Redwood City, CA (US); Viral Shah, Redwood City, CA (US); Shasank Kisan Chavan, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 10 days.

(21) Appl. No.: 16/926,425

(22) Filed: Jul. 10, 2020

(65) Prior Publication Data

US 2021/0081356 A1   Mar. 18, 2021

Related U.S. Application Data

(60) Provisional application No. 62/900,393, filed on Sep. 13, 2019.

(51) Int. Cl.
*G06F 16/11* (2019.01)
*G06F 16/901* (2019.01)

(52) U.S. Cl.
CPC .......... *G06F 16/122* (2019.01); *G06F 16/901* (2019.01)

(58) Field of Classification Search
CPC ... G06F 16/122; G06F 16/901; G06F 16/2272
See application file for complete search history.

(56) References Cited

U.S. PATENT DOCUMENTS

| 5,680,573 A | 10/1997 | Rubin |
| 7,328,192 B1 | 2/2008 | Stengard et al. |
| 8,280,853 B1 | 10/2012 | Lai |

(Continued)

OTHER PUBLICATIONS

Marwah, U.S. Appl. No. 13/804,581, filed Mar. 14, 2013, Office Action, dated Jun. 1, 2018.

(Continued)

*Primary Examiner* — Cam Y T Truong
(74) *Attorney, Agent, or Firm* — Hickman Becker Bingham Ledesma LLP

(57) ABSTRACT

Techniques are provided for a DBMS automating ILM on indexes, based on index composition, to efficiently reduce index storage footprints. According to an embodiment, a user sets an index-specific ILM (ISILM) policy, which comprises one or both of an index-test requirement and a time requirement. Based on the ISILM policy being met, or on some other way of initiating analysis, the DBMS automatically analyzes the data blocks storing the index to determine an index condition metric (e.g., percentage of free space). This analysis is performed on a sample of data blocks storing the index without blocking the index from other operations during the analysis. The condition metric for the entire index is estimated based on analysis of the sample data blocks. Using the determined condition metric for an index, the DBMS automatically selects an option for optimally managing the index (e.g., coalesce, shrink space, index rebuild, no action, etc.).

26 Claims, 7 Drawing Sheets

(56) References Cited

U.S. PATENT DOCUMENTS

| | | | |
|---|---|---|---|
| 8,316,051 | B1 | 11/2012 | Burns |
| 8,688,654 | B2 | 4/2014 | Groseclose |
| 9,275,063 | B1 | 3/2016 | Natanzon |
| 10,037,271 | B1 | 7/2018 | Andersen |
| 10,360,192 | B1 | 7/2019 | Sela |
| 2003/0101133 | A1 | 5/2003 | DeFrancesco |
| 2003/0236781 | A1 | 12/2003 | Lei |
| 2004/0098383 | A1 | 5/2004 | Tabellion |
| 2004/0117407 | A1 | 6/2004 | Kumar et al. |
| 2004/0215626 | A1* | 10/2004 | Colossi ............. G06F 16/24542 |
| 2005/0149584 | A1 | 7/2005 | Bourbonnais et al. |
| 2005/0187917 | A1* | 8/2005 | Lawande ............. G06F 16/217 |
| 2006/0101052 | A1 | 5/2006 | Netrakanti |
| 2006/0218127 | A1 | 9/2006 | Tate et al. |
| 2007/0198552 | A1 | 8/2007 | Farrand |
| 2007/0208665 | A1 | 9/2007 | Ohara |
| 2008/0021859 | A1 | 1/2008 | Berkhin |
| 2008/0040505 | A1 | 2/2008 | Britto et al. |
| 2008/0235183 | A1 | 9/2008 | Draese et al. |
| 2009/0187544 | A1 | 7/2009 | Hsu et al. |
| 2009/0198729 | A1 | 8/2009 | Gong |
| 2010/0274827 | A1 | 10/2010 | Hix et al. |
| 2011/0082842 | A1 | 4/2011 | Groseclose et al. |
| 2011/0106863 | A1 | 5/2011 | Mamidi |
| 2011/0282830 | A1 | 11/2011 | Malige |
| 2012/0011329 | A1 | 1/2012 | Nonaka |
| 2012/0042130 | A1 | 2/2012 | Peapell |
| 2012/0137059 | A1 | 5/2012 | Yang et al. |
| 2012/0185648 | A1 | 7/2012 | Benhase |
| 2012/0233129 | A1 | 9/2012 | Brinkmoeller |
| 2012/0260040 | A1 | 10/2012 | Mallge |
| 2013/0013850 | A1 | 1/2013 | Baderdinni |
| 2013/0073788 | A1 | 3/2013 | Post |
| 2013/0151804 | A1 | 6/2013 | Alatorre |
| 2013/0297615 | A1* | 11/2013 | Stewart ................. G06F 16/334 707/741 |
| 2014/0095438 | A1 | 4/2014 | Marwah et al. |
| 2014/0095442 | A1 | 4/2014 | Guo et al. |
| 2014/0095448 | A1 | 4/2014 | Marwah et al. |
| 2014/0095449 | A1 | 4/2014 | Marwah et al. |
| 2014/0095450 | A1 | 4/2014 | Marwah et al. |
| 2014/0122778 | A1 | 5/2014 | O'Brien |
| 2018/0253443 | A1 | 9/2018 | Marwah |
| 2021/0117868 | A1* | 4/2021 | Sriharsha ............... G06N 20/00 |
| 2021/0279221 | A1* | 9/2021 | Taylor ................. G06F 16/2272 |

OTHER PUBLICATIONS

Marah, U.S. Appl. No. 15/912,314, filed Mar. 5, 2018, Advisory Action, dated Apr. 17, 2020.
Marwah, U.S. Appl. No. 15/912,314, filed Mar. 5, 2018, Office Action, dated Aug. 23, 2018.
Marwah, U.S. Appl. No. 15/912,314, filed Mar. 5, 2018, Office Action, dated Aug. 1, 2019.
Marwah, U.S. Appl. No. 15/912,314, filed Mar. 5, 2018, Final Office Action, dated Apr. 2, 2019.
Marwah, U.S. Appl. No. 15/912,314, filed Mar. 5, 2018, Advisory Action, dated Jul. 5, 2019.
Marwah, U.S. Appl. No. 13/826,075, filed Mar. 14, 2013, Interview Summary, dated Jul. 17, 2017.
Marwah, U.S. Appl. No. 13/826,075, filed Mar. 14, 2013, Office Action, dated Dec. 5, 2016.
Marwah, U.S. Appl. No. 13/826,075, filed Mar. 14, 2013, Notice of Allowance, dated Oct. 11, 2017.
Marwah, U.S. Appl. No. 15/912,314, filed Mar. 5, 2018, Notice of Allowance, dated May 15, 2020.
Marwah, U.S. Appl. No. 13/826,075, filed Mar. 14, 2013, Final Office Action, dated May 10, 2017.
Marwah, U.S. Appl. No. 13/804,394, filed Mar. 14, 2013, Office Action, dated Jun. 1, 2018.
Marwah, U.S. Appl. No. 13/804,581, filed Mar. 14, 2013, Office Action, dated May 19, 2017.
Marwah, U.S. Appl. No. 13/804,581, filed Mar. 14, 2013, Notice of Allowance, dated Jan. 24, 2019.
Marwah, U.S. Appl. No. 13/804,581, filed Mar. 14, 2013, Final Office Action, dated Jan. 22, 2018.
Marwah, U.S. Appl. No. 13/804,394, filed Mar. 14, 2013, Office Action, dated Sep. 19, 2019.
Marwah, U.S. Appl. No. 13/804,394, filed Mar. 14, 2013, Office Action, dated May 11, 2017.
Marwah, U.S. Appl. No. 13/804,394, filed Mar. 14, 2013, Final Office Action, dated Feb. 26, 2018.
Marwah, U.S. Appl. No. 13/804,394, filed Mar. 14, 2013, Advisory Action, dated May 10, 2018.
Marwah U.S. Appl. No. 13/804,581, filed Mar. 14, 2013, Interview Summary, dated Sep. 22, 2017.
Marwah, U.S. Appl. No. 13/826,075, filed Mar. 14, 2013, Interview Summary, dated Mar. 6, 2017.
U.S. Appl. No. 13/804,581, filed Mar. 14, 2013, Final Office Action, dated Jun. 17, 2015.
U.S. Appl. No. 13/826,075, filed Mar. 14, 2013, Office Action, dated Feb. 26, 2016.
U.S. Appl. No. 13/826,075, filed Mar. 14, 2013, Final Office Action, dated Jul. 5, 2016.
U.S. Appl. No. 13/826,075, filed Mar. 14, 2013, Office Action, dated Dec. 5, 2016.
U.S. Appl. No. 13/826,075, filed Mar. 14, 2013, Office Action, dated Aug. 13, 2015.
U.S. Appl. No. 13/826,075, filed Mar. 14, 2013, Interview Summary, dated Nov. 18, 2015.
U.S. Appl. No. 13/826,075, filed Mar. 14, 2013, Interview Summary, dated Jun. 2, 2016.
U.S. Appl. No. 13/826,075, filed Mar. 14, 2013, Final Office Action, dated Feb. 2, 2015.
U.S. Appl. No. 13/826,075, filed Mar. 14, 2013, Advisory Action, dated May 13, 2015.
Marwah, U.S. Appl. No. 15/912,314, filed Mar. 5, 2018, Final Office Action, dated Jan. 21, 2020.
U.S. Appl. No. 13/804,581, filed Mar. 14, 2013, Office Action, dated Nov. 19, 2015.
U.S. Appl. No. 13/826,075, filed Mar. 14, 2013, Office Action, dated Oct. 1, 2014.
U.S. Appl. No. 13/804,581, filed Mar. 14, 2013, Final Office Action, dated Jun. 3, 2016.
U.S. Appl. No. 13/804,394, filed Mar. 14, 2013, Office Action, dated Jun. 22, 2015.
U.S. Appl. No. 13/804,394, filed Mar. 14, 2013, Office Action, dated Oct. 22, 2014.
U.S. Appl. No. 13/804,394, filed Mar. 14, 2013, Interview Summary, dated Nov. 16, 2015.
U.S. Appl. No. 13/804,394, filed Mar. 14, 2013, Interview Summary, dated May 5, 2016.
U.S. Appl. No. 13/804,394, filed Mar. 14, 2013, Final Office Action, dated Feb. 10, 2016.
U.S. Appl. No. 13/804,394, filed Mar. 14, 2013, Advisory Action, dated May 11, 2016.
Marwah, U.S. Appl. No. 13/804,394, filed Mar. 14, 2013, Final Office Action, dated Dec. 5, 2018.
U.S. Appl. No. 13/804,581, filed Mar. 14, 2013, Interview Summarry, dated Nov. 16, 2015.
Lambert, Bob, "DMBI Tech Tip: Include Audit Columns on all Tables", CapTech Venrures, dated Jan. 12, 2011, 2 pages.
Ahmed et al., "Lifecycle Management of Relational Records for External Auditing and Regulatory Compliance", IEEE, dated 2011, 8 pages.
Marwah, U.S. Appl. No. 13/804,394, filed Mar. 14, 2013, Notice of Allowance, dated Oct. 28, 2020.
Hirschtein et al., "White Paper Unlocking the Potential of Information Lifecycle Managemnt: Usage-based Data Classification for Oracle Databases", dated Aug. 15, 2007, 20 pages.
Anonymous:, "Implementing Information Lifecycle Management Using the ILM Assistant", dated Aug. 16, 2007, 42 pages.
Oracle, "Automatic Data Optimization" White Paper, dated Feb. 2019, 11 pages.

(56) References Cited

OTHER PUBLICATIONS

Oracle Help Center, "Database SQL Language Reference", dated 1996, 10 pages.
Oracle Database, "VLDB and Partitioning Guide, 19c", dated May 2019, 443 pages.
Elasticsearch Reference [7.3], "Actions", https://www.elastic.co/guide/en/elasticsearch/reference/7.3/_actions.html, dated Apr. 29, 2020, 48 pages.
Marwah, U.S. Appl. No. 15/912,314, filed Mar. 5, 2018, Notice of Allowance and Fees Due, dated Aug. 12, 2021.

* cited by examiner

FIG. 5

502 — MAINTAIN, BY A DATABASE MANAGEMENT SYSTEM, AN INDEX THAT (A) IS ASSOCIATED WITH A TABLE AND (B) IS ALLOCATED A PLURALITY OF DATA BLOCKS, IN WHICH INDEX DATA FOR THE TABLE IS STORED

504 — MAINTAIN, BY THE DATABASE MANAGEMENT SYSTEM, AN INDEX OPTIMIZATION RULESET THAT COMPRISES A PLURALITY OF INDEX MANAGEMENT OPTIONS AND ONE OR MORE CONDITION METRIC THRESHOLDS

506 — DETERMINE TO ANALYZE THE INDEX FOR OPTIMIZATION

508 — ANALYZE ONE OR MORE DATA BLOCKS, OF THE PLURALITY OF DATA BLOCKS, TO GENERATE A CONDITION METRIC FOR THE INDEX

510 — SELECT, BASED ON THE GENERATED CONDITION METRIC FOR THE INDEX AND THE PLURALITY OF CONDITION METRIC THRESHOLDS, AN INDEX MANAGEMENT OPTION, OF THE PLURALITY OF INDEX MANAGEMENT OPTIONS, TO BE IMPLEMENTED FOR THE INDEX

512 — IMPLEMENT THE SELECTED INDEX MANAGEMENT OPTION ON THE INDEX

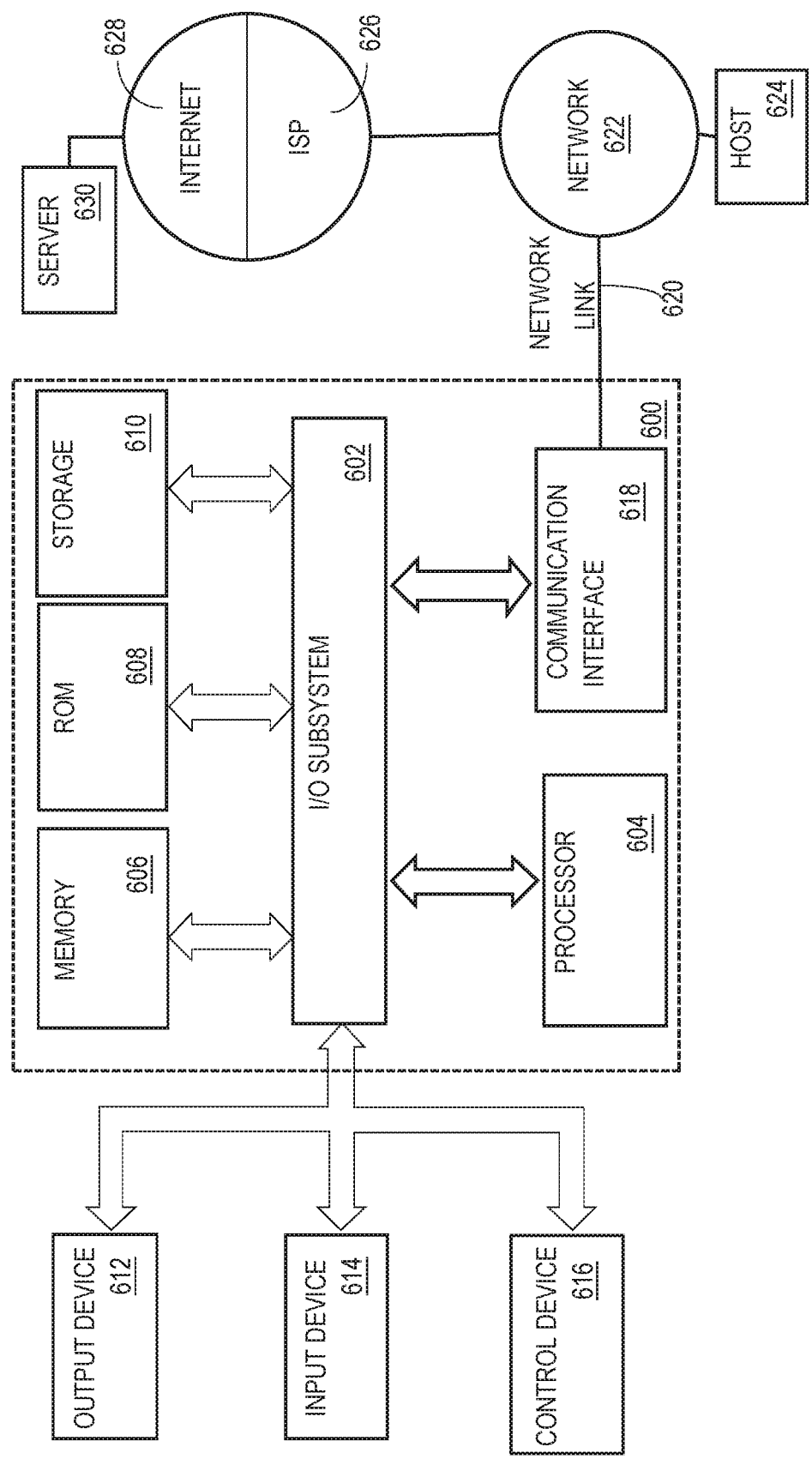

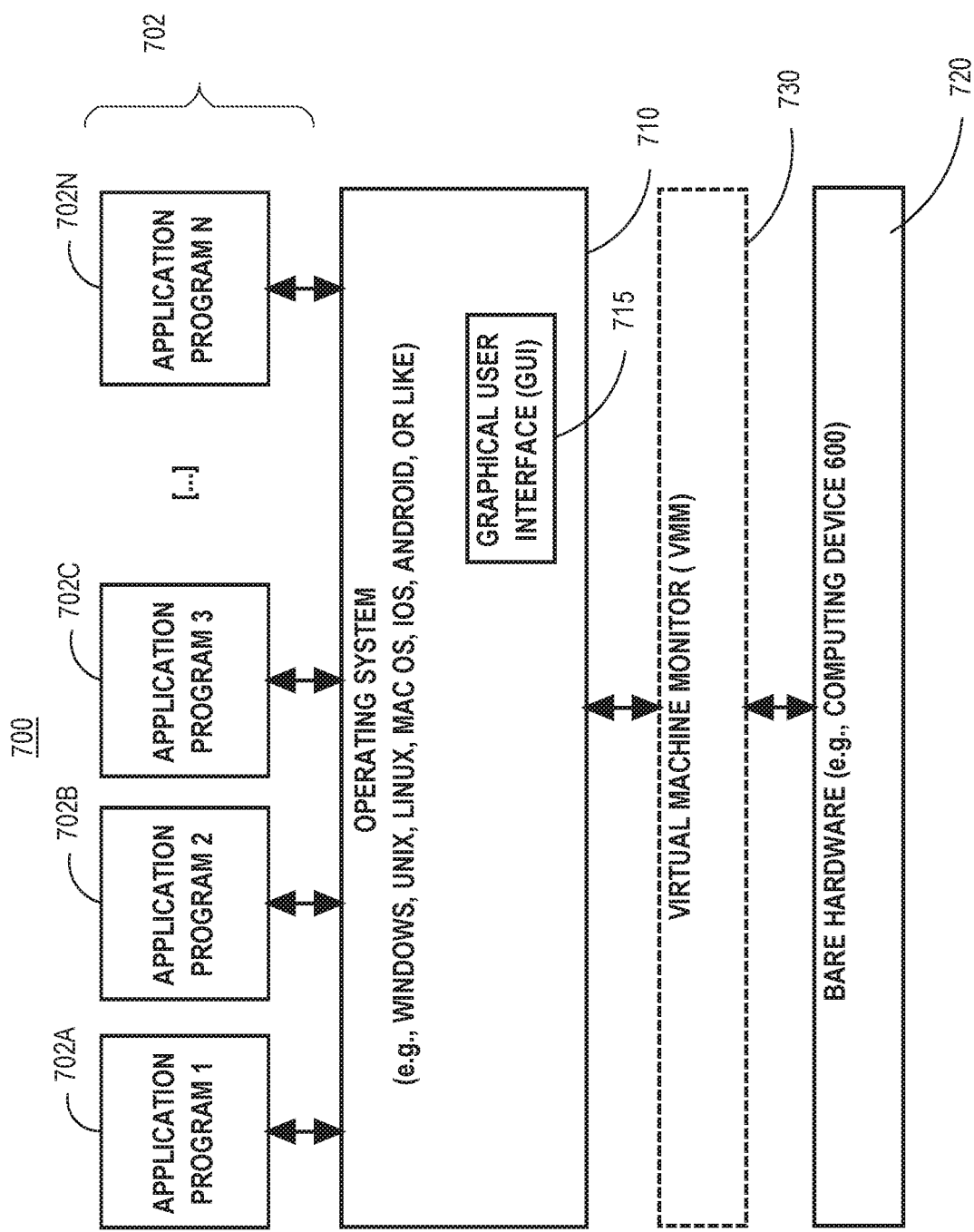

AUTOMATED INFORMATION LIFECYCLE MANAGEMENT OF INDEXES

CROSS-REFERENCE TO RELATED APPLICATIONS; BENEFIT CLAIM

This application claims the benefit of Provisional Appln. 62/900,393, filed Sep. 13, 2019, the entire contents of which is hereby incorporated by reference as if fully set forth herein, under 35 U.S.C. § 119(e).

Furthermore, this application is related to the following applications, the entire contents of each of which is incorporated by reference as if fully set forth herein:
U.S. Pat. No. 9,910,861 B2, filed Mar. 14, 2013, issued Mar. 6, 2018, titled "Automated Information Lifecycle Management Using Low Access Patterns", referred to herein as the "Automated Information Lifecycle Management Patent";
U.S. Pat. No. 10,318,493 B2, filed Mar. 14, 2013, issued Jun. 11, 2019, titled "Custom Policy Driven Data Placement And Information Lifecycle Management";
U.S. patent application Ser. No. 13/804,394, filed Mar. 14, 2013, titled "Policy Driven Data Placement And Information Lifecycle Management"; and
U.S. patent application Ser. No. 15/912,314, filed Mar. 5, 2018, titled "Automated Information Lifecycle Management Using Low Access Patterns".

FIELD OF THE INVENTION

The present invention relates to approaches for information lifecycle management of indexes, and, more specifically, for automatically determining an approach for optimization of a given index based, at least in part, on sampled index statistics.

BACKGROUND

Data is generated and stored at ever increasing rates in organizations both governmental and corporate. Many times, the efficient execution of queries over stored data is paramount to an organization's success. One popular method of increasing the speed of queries is indexing portions of the stored data. An index is a database object that provides fast access to indexed data from one or more other database objects, but, in turn, must be maintained current as the indexed database objects undergo changes in the database. Insertions and deletions of data in an index generally lead to fragmentation of index storage, where, after a time, a significant portion of an index segment storing the index does not store current, indexed data.

In order to conserve resources and reduce storage costs, it is generally desirable to keep the index storage footprint in a database as small as possible without sacrificing query performance. To that end, a database management system (DBMS) generally provides one or more information lifecycle management (ILM) approaches that reduce fragmentation of index storage and, at times, shrink the storage footprint of an index.

Generally, in order to apply an ILM approach to an index, DBMS users are required to evaluate the available options and explicitly choose one or more management approaches for the index. However, the different ILM approaches have various trade-offs that are not always well-understood, e.g., varying levels of redo generation, CPU usage, and potentially unnecessary work (such as rebuilding parts of the index that do not require rebuilding). Furthermore, these trade-offs may be affected by the condition of an index, including the distribution of index data within an index, and the amount of fragmentation in data blocks storing an index, etc. Thus, user selection of an ILM approach for a given index requires expertise in the particulars of the index and in the aspects of the available management techniques. Thus, the chosen ILM approach for a given index may or may not be the most efficient or effective technique for the index.

Furthermore, the selection of an ILM approach for an index may not be made at the time that the approach is to be implemented, e.g., the ILM approach for an index is input into configuration data prior to the index requiring ILM. This reduces the amount of information about the index that can be known at the time that the ILM approach for the index is selected. Even if the ILM approach selected for an index would be appropriate at the time it was input into the configuration data, as the index changes over time, the selected management technique may become less effective for the evolving situation.

As such, it would be beneficial to provide automated index ILM that does not require a user to explicitly select an ILM approach for a given index.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:
FIG. 5 depicts a flowchart for using an index optimization ruleset and sampled index statistics to automatically select an index ILM approach to implement for a given index.
FIG. 6 is a block diagram that illustrates a computer system upon which an embodiment may be implemented.
FIG. 7 is a block diagram of a basic software system that may be employed for controlling the operation of a computer system.

DETAILED DESCRIPTION

Figure 1:
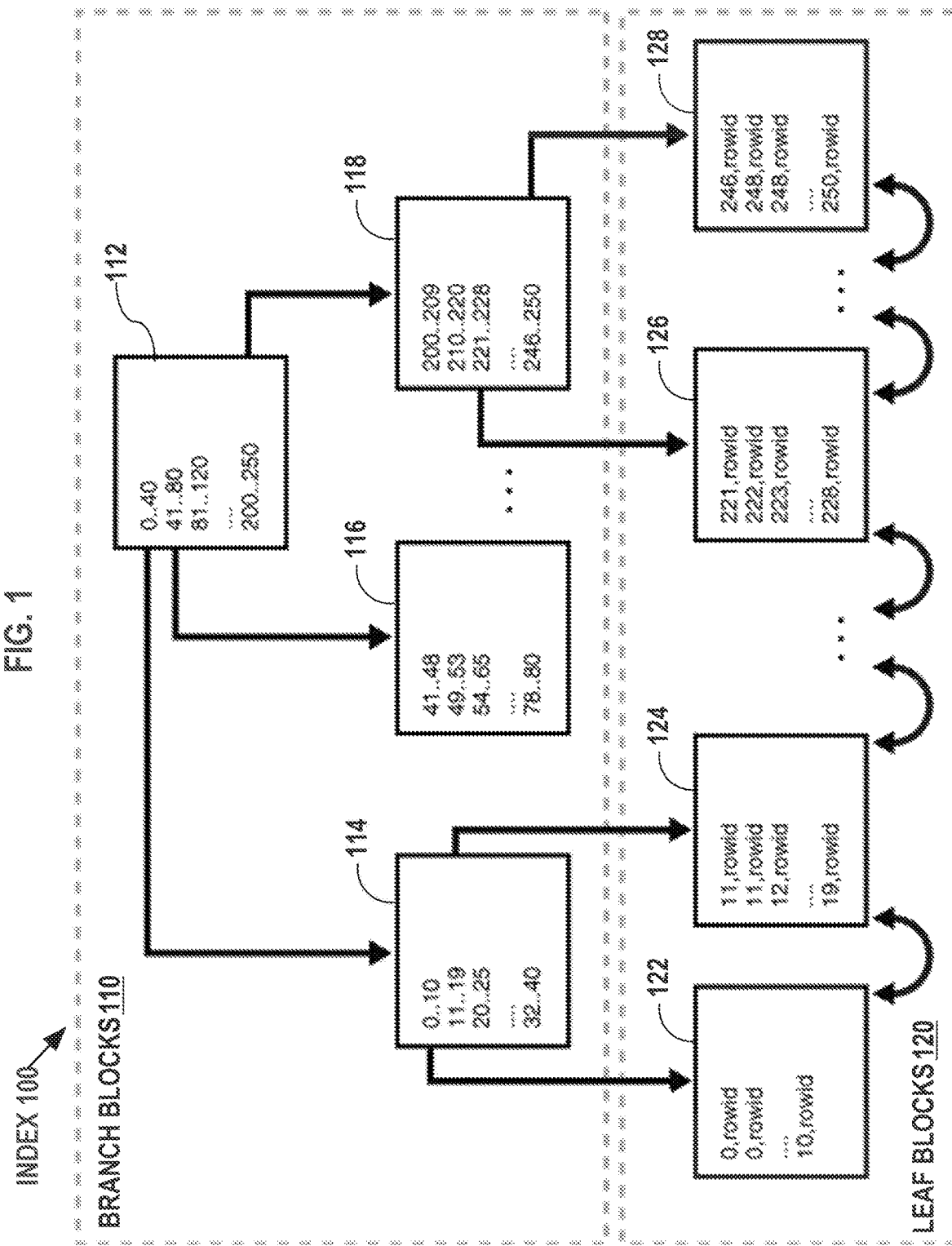
FIG. 1 depicts an example structure of a B-tree index.

In the following description, for the purposes of explanation, numerous specific details are set forth in order to provide a thorough understanding of the presented techniques. It will be apparent, however, that the presented techniques may be practiced without these specific details. In other instances, well-known structures and devices are shown in block diagram form in order to avoid unnecessarily obscuring the presented techniques.

General Overview

Techniques are described herein for a DBMS using sampled statistics of an index to automatically select an ILM approach for the index at the time that the ILM approach is to be implemented. The reduced storage footprint of indexes maintained by the DBMS reduces the cost of storing the indexes. According to an embodiment, a user sets, via an instruction to the DBMS, an index-specific ILM (ISILM)

policy for a given index, which comprises one or both of an index-test requirement and a time requirement. When an ISILM policy for a given index is met, i.e., when the requirements indicated by the ISILM policy are met, the DBMS initiates automated ILM for the index.

An ISILM policy, for a given index, does not require specification of a particular approach for index ILM because the DBMS automatically selects a particular ILM approach based on the composition of the index. The heuristics used by the DBMS to automatically select ILM approaches for indexes are configured to select an approach, for a given index, that results in the least expenditure of resources given the statistics of the index. Specifically, when it is determined to analyze a given index for ILM, e.g., when the ISILM policy for an index is met, the DBMS automatically analyzes the data blocks in the index segment, for the index, to determine an index condition metric (e.g., percentage of free space).

According to an embodiment, this analysis is performed on a sample (strict subset) of the data blocks in the index segment without blocking the index from other operations during the analysis, which increases the utility of indexes while index statistics are being gathered. A condition metric for the entire index is estimated based on the analysis of the sample of data blocks. Using the determined condition metric for an index, the DBMS automatically selects an ILM approach for the index (e.g., a coalesce operation, a shrink space operation, an index rebuild operation, etc.), or determines to perform no ILM at the time.

Allowing the DBMS to automatically select an approach for index ILM allows a user to effectively, and efficiently, implement ILM for the index without requiring expertise regarding the trade-offs of the different approaches. Furthermore, allowing the DBMS to automatically select an ILM approach for a given index provides flexibility in the approach taken, depending on the composition of the index at the time that ILM is to be implemented. The efficient and non-blocking analysis of index statistics allows for performance of an ILM approach that is tailored to the specific situation of the index without blocking other operations on the index during analysis. Furthermore, estimating the condition metric for an index based on a sample of the index data blocks, rather than calculating the statistics from the entire index, allows for faster analysis of the index.

Index Structure

An index occupies an index segment in a tablespace, which may or may not include the database object indexed by the index. A segment, such as an index segment, is generally defined using a set of extents, where an extent contains one or more contiguous database blocks. When the existing extents of a segment are full, another extent is allocated for that segment. For each index segment, one or more free lists are maintained; a free list is a list of data blocks that have been allocated for that segment's extents and have free space that is available for inserts.

FIG. 1 depicts an example index 100. Index 100 is a B-tree index, which comprises an ordered list of values divided into ranges. In index 100, a key is associated with a row or range of rows. Example index 100 illustrates an index on the department_id column, which is a foreign key column in an employee table. When an index is first created to index data from an associated database object, the index is created compactly, i.e., without data fragmentation. For example, index 100 is depicted in FIG. 1 just after it was first created. As such, the branch blocks 110 and the leaf blocks 120 of index 100 are maximally utilized given the indexed data.

Embodiments are described in the context of a B-tree index; however, embodiments are not limited to B-tree type indexes.

Figure 2:
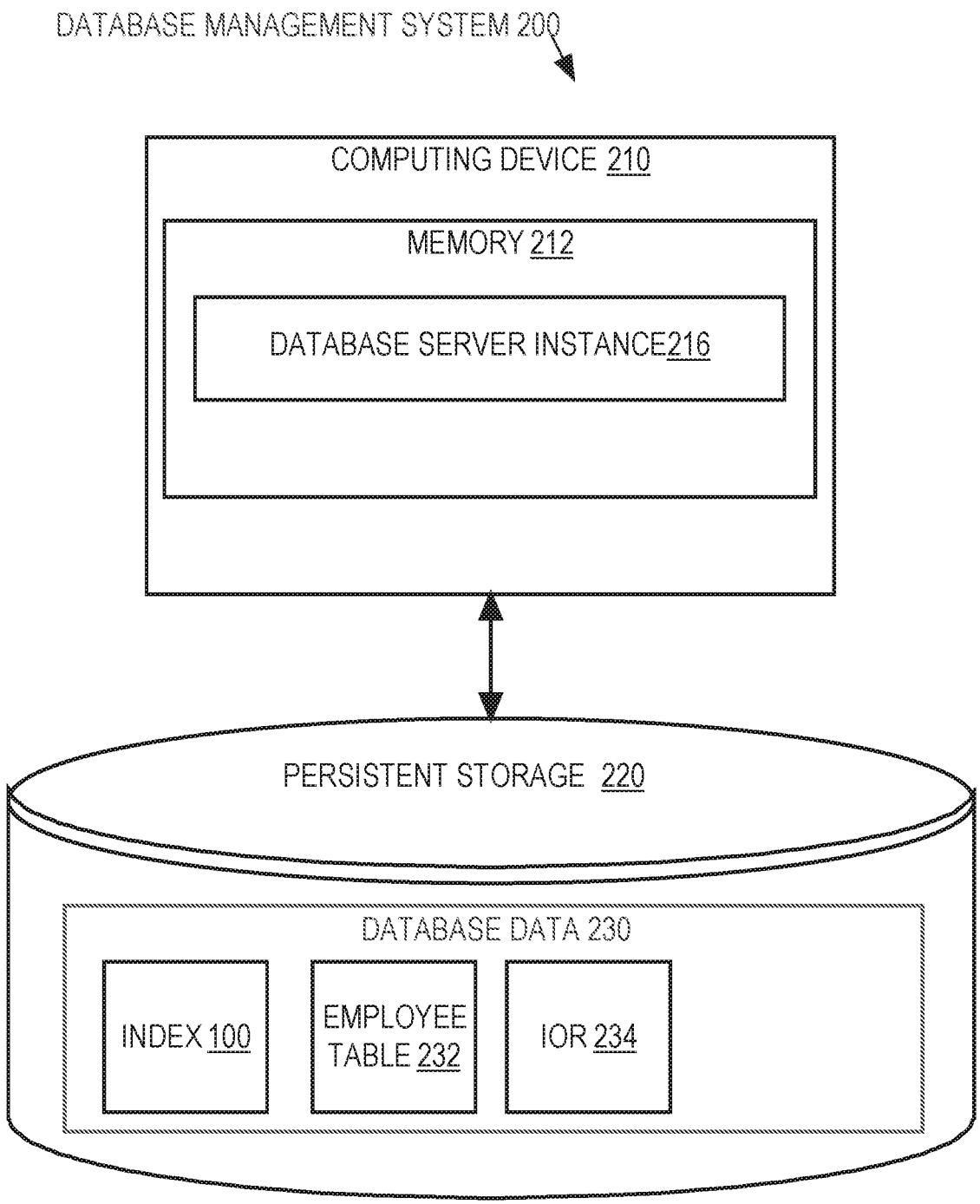
FIG. 2 depicts an example database management system.

According to an embodiment, index 100 is maintained by a database management system 200 depicted in FIG. 2, which comprises a computing device 210 with memory 212. Herein, according to embodiments, like numbered elements in the figures refer to similar, or the same, entities. In memory 212, device 210 runs a database server instance 216, which manages database data in persistent storage 220 (e.g., database data 230). FIG. 2 further depicts, in database data 230 maintained by database server instance 216, index 100 and an employee table 232 that is indexed by index 100.

A DBMS automatically maintains and uses indexes to answer queries after the indexes are created. However, changes to the indexed data must be propagated to the index. As the index is updated, free space is introduced among the data blocks allocated to the index segment, introducing fragmentation, which causes the index to have a larger storage footprint than is necessary to represent the indexed information. Returning to example index 100, as changes are made to table 232, instance 216 automatically changes index 100 to reflect the changes made to the table.

As the changes are made to index 100, fragmentation is introduced into the data blocks representing the index. To illustrate, while leaf block 122 is filled to capacity, a data manipulation language (DML) instruction is performed in employee table 232 to insert a row with a department_id value of '2'. In connection with this insertion of the row into employee table 232, instance 216 inserts index information, into index 100, for the new row.

Because the department_id value in the new row is '2', the index information for the row maps to leaf block 122, which does not have room for the information needed to index the new row. Thus, instance 216 performs a split operation on block 122 by which the data in block 122 is split among block 122 and a new leaf block allocated for index 100.

Figure 3:
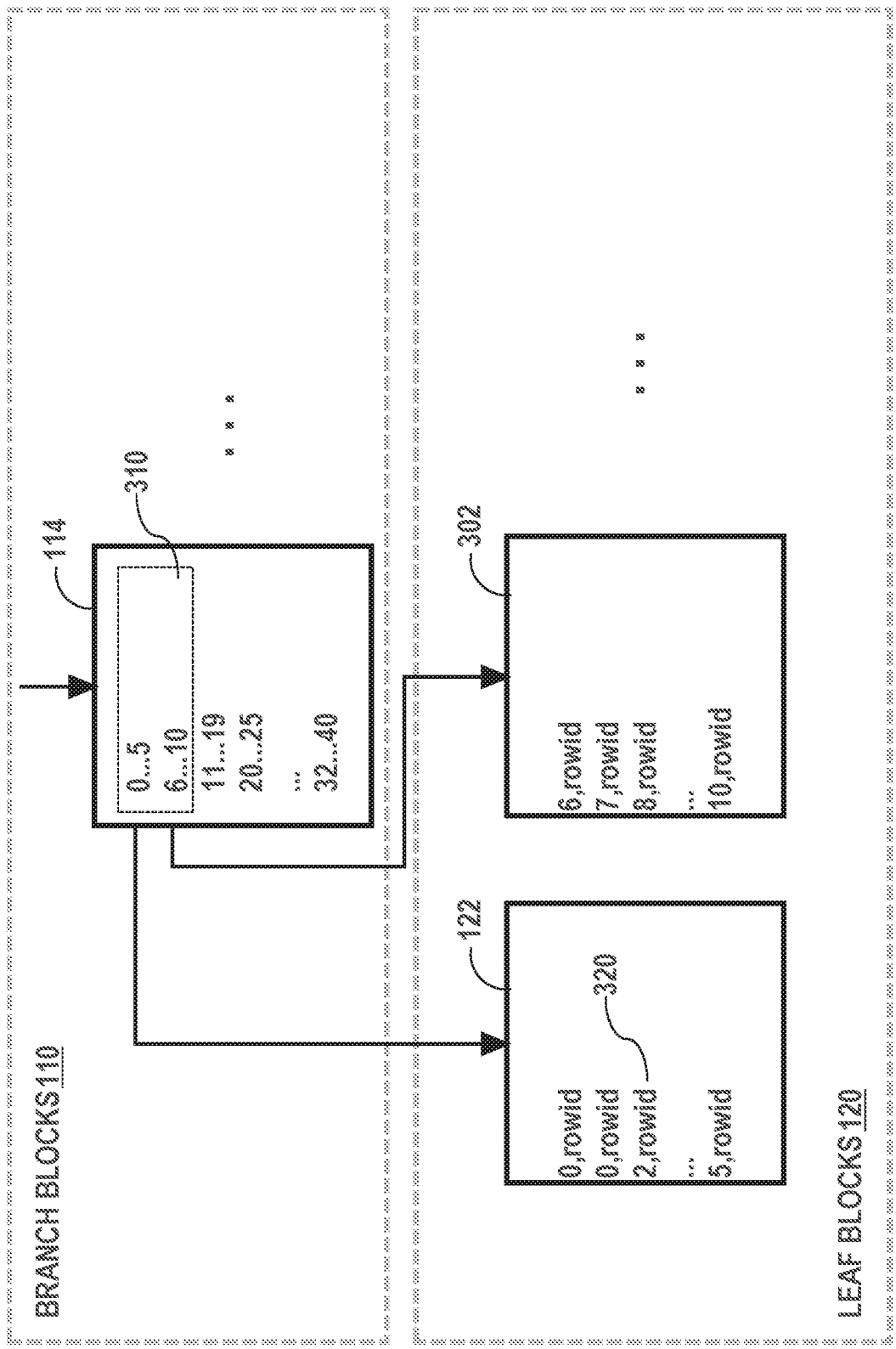
FIG. 3 depicts a portion of a B-tree index that includes a branch block and two leaf blocks.

To illustrate, FIG. 3 depicts a portion of index 100 that includes branch block 114 and two leaf blocks 122 and 302, which is the new leaf block storing information that was in block 122 prior to the split operation. More specifically, instance 216 splits the range of department_id values previously assigned to block 122, i.e., '0'-'10', into two sub-ranges 310, which are '0'-'5' and '6'-'10'. Instance 216 assigns the index value range '0'-'5' to block 122, and assigns the index value range '6'-'10' to block 302. Now that some space in block 122 has been freed by the split operation, new index information 320, referring to the new row in table 232, is inserted into block 122.

Assuming that the index information is generally equally divided among leaf blocks 122 and 302, both blocks 122 and 302 are about half-empty after the insertion of the new index information. Over time, as insertion and deletion operations are performed on table 232, which are reflected in index 100, the data blocks storing index 100 become fragmented. This fragmentation causes index 100 to have a larger storage footprint than is necessary to represent the indexed information.

An index may be partitioned, where each partition of the index is stored in a respective index segment. ILM approaches may be implemented on an index at a partition-level, where the determinations of whether to optimize a particular index partition, and what ILM approach to use for the partition, may be performed independently from the other partitions of the index. Accordingly, herein, references to optimization of indexes are also applicable to index partitions, according to an embodiment.

Index Management Techniques

There are multiple approaches to index ILM, which reduce or eliminate fragmentation in an index. These approaches vary in effectiveness, and in resources required, and also in the resulting reduction in storage footprint for the subject index. Furthermore, the effectiveness and resources required for a given ILM technique may be different depending on the state of the index being managed.

One ILM approach for an index is a coalesce operation, which is a very cost effective but not a very intrusive ILM approach, but does not shrink the number of data blocks allocated for the index. Specifically, a coalesce operation reduces fragmentation in the index by combining data from adjacent data blocks, storing index data, into fewer data blocks without releasing the freed data blocks from the index segment. A coalesce operation itself does not require locking the index for write operations, which allows any required write and read operations within the index during the coalesce operation. However, if an index data block is subject to a lock at the time of coalescing, the DBMS skips the data block.

After the index data is combined into fewer data blocks, the newly-empty data blocks are placed on a free list of the index segment. The data blocks on the free list of the index segment may then be used for further growth of the index. A coalesce operation is relatively inexpensive, and does not block access to the index during the operation. However, after an index is coalesced, there is generally some fragmentation that remains in the index segment caused by skipping data blocks subject to locks at the time of the operation. Furthermore, a coalesce operation does not reduce the storage footprint of the coalesced index.

Figure 4:
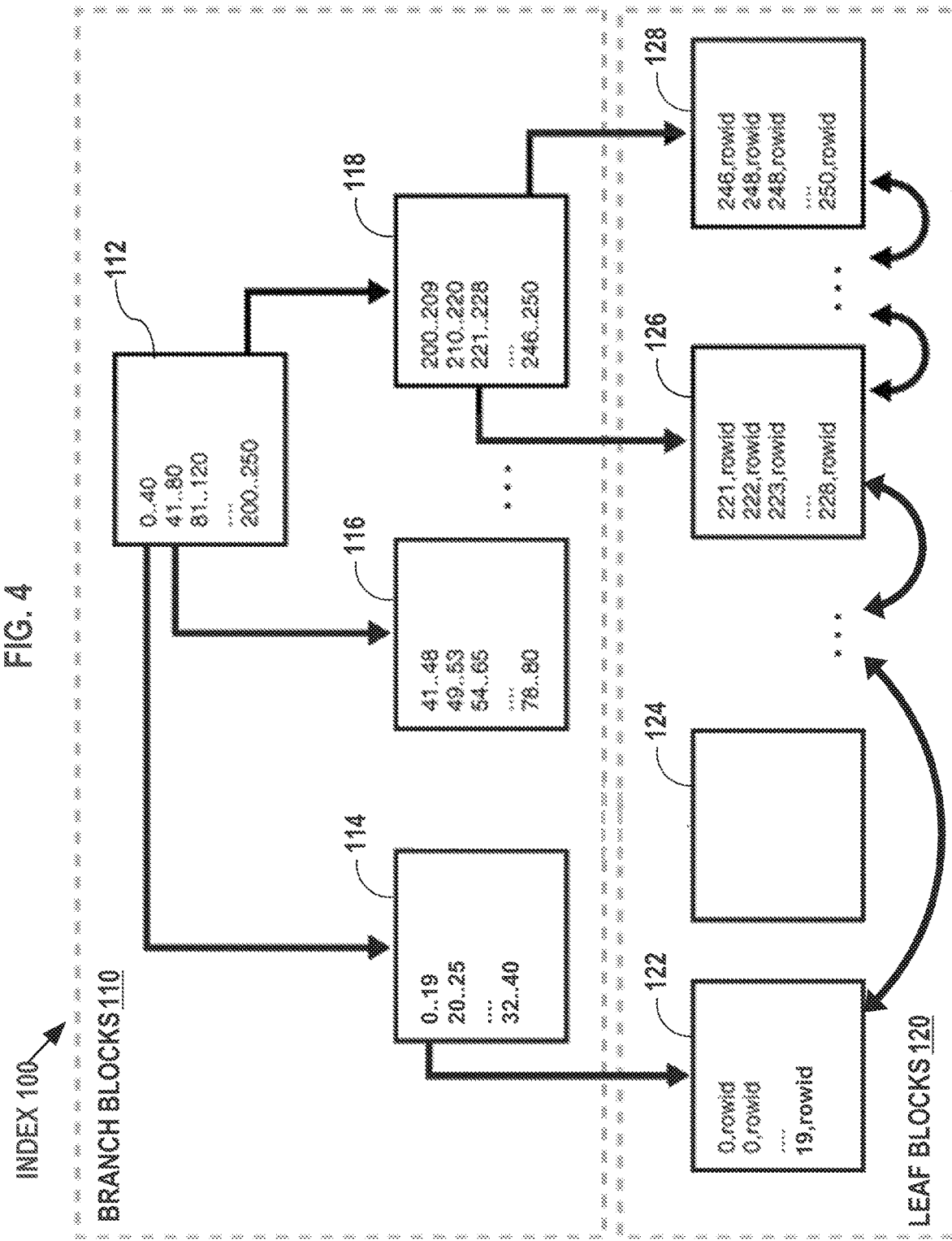
FIG. 4 depicts an example B-tree index after implementation of a coalesce/shrink operation.

To illustrate, instance 216 initiates a coalesce operation on index 100. At that time, block 122 is 25% full and block 124 is 50% full. Further, at the time of the coalesce operation, one or more rows within block 128 are subject to a lock, e.g., to perform a DELETE-type DML operation on the data in the one or more rows. In connection with the coalesce operation, instance 216 analyzes those leaf blocks, of leaf blocks 120, that are not the subject of locks at the time (e.g., at least leaf blocks 122, 124, and 126, but not block 128) to determine if the information stored in the blocks may be consolidated. Based on the analysis, instance 216 determines that the content of block 124 may be migrated to block 122, as shown in FIG. 4. Accordingly, after the coalesce operation, the information that was previously in block 124 is stored in block 122, thereby freeing the space in block 124.

Notwithstanding the example involving consolidating two blocks into one, the content of any number of blocks may be consolidated into a single block by a coalesce operation. However, while a coalesce operation shrinks the size of the index, the operation does not release the emptied data blocks back to the tablespace. Thus, after the coalesce operation, freed block 124 remains in the index segment for index 100, and is available for use when additional blocks are required for the index.

Another related ILM approach for an index is a shrink compact operation, which effectively coalesces the subject index. In contrast with the coalesce operation, after the index data is combined into fewer data blocks, the shrink compact operation causes the used blocks to be gathered to the head of the index segment, which leaves the empty blocks at the tail of the segment. A shrink compact operation is more expensive than a coalesce operation, where the increased expense depends on the number of blocks that must be moved within the index segment. Further, after an index undergoes a shrink compact operation, there is generally some fragmentation that remains in the index segment caused by skipping performing the shrink compact operation on data blocks that were subject to locks at the time of the operation. To illustrate a shrink compact operation in the context of FIG. 4, after coalescing the contents of the data blocks, the emptied block shown as block 124 is moved to the tail of the index segment for index 100, e.g., using copy operations to shift the contents of the blocks.

Yet another related ILM approach for an index is a shrink space operation, which is like a shrink compact operation except the free blocks at the tail of the index segment are returned to the tablespace storing the index segment for index 100 instead of remaining in the index segment. Thus, a shrink space operation reduces the number of index blocks allocated to the index. The cost of a shrink space operation is greater than a shrink compact operation in that removing the free blocks from the tail of the index segment involves a short-duration segment level lock to adjust (lower) the high water mark for the index segment. Returning to the example of FIG. 4, in connection with a shrink space operation, after moving block 124 to the tail of the index segment for index 100, the block is returned to the tablespace storing the index segment.

Yet another ILM approach for an index is a rebuild operation. An index rebuild operation creates a new index database object with the data from the subject index. Once the new index database object is populated with the index data, the old index data structure is deleted. A rebuilt index database object is as compact as possible, given that the index construction process generates an unfragmented data structure. An index rebuild operation may or may not allow operations over the index, including DMLs, during the rebuild operation. Furthermore, an index rebuild operation may also compress the index data in the new index database object.

Because the new index structure is created and populated from the old index structure, rebuilding an index temporarily requires twice the storage space of the index prior to rebuilding. Based on the space requirement, and CPU usage for constructing a new index database object, an index rebuild operation is the most expensive ILM approach for indexes. However, an index rebuild operation results in a very compact structure with the smallest possible storage footprint, and the index segment for the rebuilt index does not include any unnecessary empty data blocks. Specifically, after a rebuild operation, the index is as compact as possible based on a "percentage free" attribute of the index, which is 10% by default but can be user-specified at time of index creation. Further, if compression is applied to the rebuilt index, the time and computing resources required to rebuild the index is increased, but the storage footprint of the index is further reduced.

Using an Index Optimization Ruleset to Automatically Select an ILM Approach for an Index FIG. 5 depicts a flowchart 500 for using an index optimization ruleset and sampled index statistics to automatically select an ILM approach to implement for a given index, according to an embodiment. At step 502 of flowchart 500, a database management system maintains an index that (a) is associated with a table and (b) is allocated a plurality of data blocks, in which index data for the table is stored. For example, instance 216 maintains index 100 that indexes data for employee table 232, as described above. Index 100 is stored in an index segment in a tablespace of database data 230, where the index segment comprises one or more extents that are, in turn, comprised of data blocks.

At step 504 of flowchart 500, the database management system maintains an index optimization ruleset that comprises a plurality of index management options and one or more condition metric thresholds. For example, DBMS 200 maintains, in a database dictionary for database data 230, an index optimization ruleset (IOR) 234 for indexes maintained by the DBMS. According to one or more embodiments, IOR 234 is: (a) provided by a database administrator, or (b) automatically generated by DBMS 200, e.g., based on a default IOR, and/or based on one or more parameters set by a database administrator.

According to an embodiment, IOR 234 includes a qualifier condition that defines the applicability of the IOR to indexes based on one or more condition metrics of the indexes (e.g., percentage of free space, a type of data being indexed, a type of the index, etc.). IOR qualifier conditions may be based on information from a database administrator, or may be based on a default setting in DBMS 200. For example, according to an embodiment, IOR 234 is applicable to all indexes maintained by the DBMS, e.g., because IOR 234 is not associated with a qualifier condition. As a further example, according to another embodiment, based on an associated qualifier condition, IOR 234 is applicable to indexes, maintained by the DBMS, with one or more particular characteristics, such as size compared to a predefined threshold, a type of the index (e.g., bitmap, B-tree, etc.), a type of data stored in the index, etc. For example, IOR 234 is associated with a qualifier condition that requires application of the IOR to indexes that are over a threshold size, thereby conserving ILM management resources for use with relatively large indexes.

IOR 234 includes a plurality of index management options that correspond to condition metric ranges defined by one or more condition metric thresholds. According to an embodiment, the condition metric ranges, defined by the condition metric thresholds, are ordered based on where the ranges fall relative to the full range of possible condition metric values. According to an embodiment, the index management options are each associated with a relative cost, and lower ranges of condition metrics are associated, in IOR 234, with lower-cost index management options. Accordingly, higher ranges of condition metrics are associated, in IOR 234, with higher-cost index management options.

For example, in IOR 234, the condition metrics represent percentages of free space in an index segment. In the following example IOR 234, ranges of percentages of free space in an index segment are mapped to the following example ILM options: no action, shrink space operation, and index rebuild operation. These example ILM options are not the only options that may be included in an IOR, according to embodiments.

IOR 234
do no action (0%-10% free)
do shrink space (11%-35% free)
do index rebuild (36% and above free)

Initiating Index Optimization

At step 506 of flowchart 500, it is determined to analyze the index for optimization. For example, instance 216 determines to analyze index 100 for optimization based on an explicit request from a user to optimize index 100, e.g., via a SQL data definition language (DDL) instruction. According to an embodiment, such an optimization request does not indicate a particular ILM approach to use for index 100, but rather is an instruction to automatically select an ILM option for index 100.

According to another embodiment, instance 216 determines to analyze index 100 for optimization based on an index-specific ILM (ISILM) policy associated with index 100, e.g., by a user. An ISILM policy allows a user to define a future time at which an index should be analyzed for ILM by defining one or both of a time requirement and an index-test requirement by which the ISILM policy may be met. When an ISILM policy for a given index is met, the DBMS determines to analyze the index for optimization based on an applicable IOR.

To illustrate an ISILM policy for index 100, a user of DBMS 200 associates index 100 with an ISILM policy by issuing the following DDL statement:
ALTER TABLE index 100
ILM ADD POLICY OPTIMIZE
AFTER 10 DAYS OF NO MODIFICATION;
This ISILM policy comprises a time requirement of 10 days, and an index-test requirement of zero write accesses to index 100. Thus, the ISILM policy of index 100 is met when there have been zero write accesses to index 100 in the past 10 days.

It is noted that the above DDL statement defining the ISILM policy for index 100 does not indicate a particular ILM approach that should be used to optimize the index when the ISILM policy is met, but only indicates that optimization should occur. The DDL statement does not indicate a particular ILM approach because DBMS 200 utilizes an IOR, such as IOR 234, which is applicable to index 100, to select an ILM option for the index upon the ISILM policy being met.

A time requirement of an ISILM policy may comprise any amount of time measured in any way, including by hours, days, weeks, months, years, etc. According to an embodiment, if an ISILM policy does not specify a time requirement, then database server instance 216 uses a default time requirement or automatically generates a time requirement, which is used as the time requirement of the ISILM policy.

An index-test requirement of an ISILM policy indicates a test by which the DBMS may determine whether the ISILM policy is met at the indicated time. The index-test requirement of an ISILM policy may be based on data accesses. For example, an ISILM index-test requirement may indicate a test of whether a number of read-type accesses or write-type accesses (or both-type accesses) are above or below a threshold number. Further, the index-test requirement may comprise a combination of such tests. Nevertheless, index-test requirements in ISILM policies are not limited to being based on index accesses. For example, PL/SQL functions may be used to define an index-test requirement that involves one or more other aspects of the index, such as index creation, or results of background work to establish whether an index is fragmented or larger than expected, etc.

ILM policies and uses are described in the Automated Information Lifecycle Management Patent, referred to above, and in *Oracle® Database, VLDB and Partitioning Guide* (19c, E96199-04, May 2019) which is incorporated herein by reference in its entirety, and in *Automatic Data Optimization*, Oracle White Paper, February 2019, which is also incorporated herein by reference in its entirety.

Returning to the discussion of step 506 of flowchart 500, after the DDL statement defining the ISILM policy for index 100 is executed by instance 216, instance 216 determines to analyze index 100 for optimization based on the ISILM policy associated with index 100 being met. More specifically, instance 216 determines that index 100 has not been modified for the past 10 days, e.g., via a background policy evaluator described in further detail below. According to an embodiment, steps 508-512 of flowchart 500 are performed in response to determining to analyze the index for optimization.

Sampling Index Data Blocks to Determine the Condition Metric for the Index

At step 508 of flowchart 500, one or more data blocks, of the plurality of data blocks, are analyzed to generate a condition metric for the index. For example, upon determining to analyze index 100 for optimization, instance 216 generates a condition metric, for index 100, based on analyzing one or more data blocks of the plurality of data blocks.

Specifically, instance 216 determines structural data for a sample of the data blocks of index 100 (e.g., a strict subset of leaf blocks 120), and, based on the structural data from the sample, estimates a condition metric for the entire index. Structural data found within each data block indicates information regarding the amount of space allocated to the block, the total space used in the block, a number of rows in the block, how many rows have been deleted from the block, what changes have been committed in the block, etc. Such structural data may be used to estimate a condition metric, such as percentage of free space in the index segment, that reflects the amount of fragmentation in the index segment.

A sample of the data blocks of index 100 may be identified in any way, including randomly. For example, instance 216 maintains a target percentage of leaf data blocks for the sample size. Instance 216 randomly picks data blocks (in the case of a B-tree index, leaf data blocks) from index 100 to be included in the sample until the sample size represents at least the target percentage of data blocks in the index segment.

To illustrate, instance 216 identifies the structural data for a target percentage of blocks in index 100, e.g., 30%, using a DDL statement to analyze a sample of the index, such as "ANALYZE INDEX index_100", with one or more parameters to indicate the target sample percentage. The statistics resulting from execution of this DDL statement are stored in a database dictionary maintained by instance 216 in database data 230. According to an embodiment, based on the structural data of the sample data blocks, instance 216 estimates the percentage of non-utilization of space for index 100 as a whole.

According to an embodiment, while instance 216 reads the structural data for the blocks, no locks are placed on the sampled blocks that would prevent any concurrent database access to the index. Thus, the structural data may be in flux at the time that instance 216 reads the data. However, the retrieved structural data is still close to correct, even with some changes being made. Furthermore, according to an embodiment, the size of the sample is configured to be sufficient to overcome any inaccuracies from fluctuating structural data. Thus, the overall condition metric estimated from the structural statistics of the sample of data blocks is a good estimate of the amount of free space in the index, even if the data blocks were in flux while the statistics were being gathered. In this way, instance 216 determines the condition metric for index 100 without blocking write access to the index, as occurs when the exact utilization data for an index is determined, e.g., via a DDL statement such as "ANALYZE INDEX index_100 VALIDATE STRUCTURE".

Returning to the discussion of step 508 of flowchart 500, based on a sample of data blocks from the index segment for index 100, instance 216 determines that the condition metric of index 100 is 5% free space.

Using the Estimated Condition Metric to Identify an Index Management Approach

At step 510 of flowchart 500, an index management option, of the plurality of index management options, is selected to be implemented for the index based on the generated condition metric for the index and the one or more condition metric thresholds. For example, instance 216 determines that the 5% free space condition metric of index 100 maps to the no-action option of IOR 234, which is the IOR that is applicable to index 100. Accordingly, instance 216 selects the no-action option to be implemented for index 100.

At step 512 of flowchart 500, the selected index management option is implemented on the index. For example, based on the selected no-action option to be implemented for index 100, instance 216 performs no index management action for index 100. The ability to perform no index management action, based on analysis of index 100 statistics, after determining that it is time to analyze index 100 for optimization allows conservation of resources in the case that it is most optimal to leave index 100 as it is.

Auto-Tuning Index Optimization Rulesets

According to an embodiment, DBMS 200 is configured to automatically tune an IOR based on a historic index ILM dataset (HIID). An HIID includes information for previously-performed index management operations. According to an embodiment, information in an HID includes one or more of the following, for each index management operation: an ILM option that was implemented, a percentage of free space in the index before and/or after implementation of the ILM option, an amount of time the ILM option took to implement, a measure of processing power that the ILM option took to implement, index size before and/or after implementation of the ILM option, index type, type of data stored in the index, a measure of index volatility, etc.

According to an embodiment, automatically tuning an IOR comprises determining, based on analysis of an HIID, zero or more adjustments to the condition metric thresholds in the IOR and/or adjustments to the ILM options included in the IOR. To illustrate, instance 216 determines to automatically tune IOR 234 based on an HIID that is stored in database data 230, e.g., in a historic dataset table not depicted in FIG. 2. For example, instance 216 determines to automatically tune an IOR based on a request from a user, based on a maintenance schedule maintained by DMBS 200, etc. Instance 216 analyzes the HID to determine the effectiveness of ILM approaches included in the HIID with respect to the condition metric in the IOR, e.g., percentage of free space in the index. This analysis may be performed using machine learning, or heuristically, depending upon implementation.

For example, instance 216 determines, based on the HID that is stored in the historic_dataset_table, that the condition metric thresholds of IOR 234 should be adjusted as follows:

IOR 234
do nothing (0%-8% free)
do shrink space (9%-30% free)
do index rebuild (31% and above free)

These adjustments of the condition metric thresholds of IOR 234 reflect trends identified by instance 216 in the HIID of shrink space operations being effective for lower percentages of free space than was previously reflected in IOR 234 (i.e., including 9% and 10% free space), and also information indicating that index rebuild operations are more effective than shrink space operations, on average, for lower percentages of free space than was previously reflected in IOR 234 (i.e., 31% and above rather than 36% and above).

After automatically tuning IOR 234, future determinations of ILM approaches for indexes in database data 230 are based on the updated IOR. Because instance 216 uses the IOR to make decisions regarding ILM approaches to implement for indexes, these decisions are made with the most up-to-date information at the time of the index analysis without requiring adjusting policies or configurations for the individual indexes.

Performing Optimization Tuning Experiments to Create an HIID

According to an embodiment, an HIID is gathered, by index 216, based on optimization tuning experiments. To illustrate, instance 216 automatically tunes IOR 234 based on performing optimization tuning experiments, rather than based on a known HIID, e.g., based on a parameter of a user request, or based on instance 216 automatically determining that there is no known HIID, etc. Performance of optimization tuning experiments is either based on a parameter of a user instruction that indicates an experimentation percentage (e.g., 6%), or based on a default experimentation percentage for the optimization tuning experiments.

In connection with performing the optimization tuning experiments, instance 216 automatically adjusts the condition metric ranges, in a working IOR, such as IOR 234, such that the condition metric ranges in the IOR overlap by the experimentation percentage. For example, prior to receiving an instruction to autotune IOR 234 based on an HIID constructed using optimization tuning experiments, IOR 234 indicates the following:

IOR 234
do nothing (0%-10% free)
do shrink space (11%-35% free)
do index rebuild (36% and above free)

Based on the instruction to autotune IOR 234 based on an HIID constructed using optimization tuning experiments, instance 216 adjusts the condition metric ranges in IOR 234 to overlap, based on the experimentation percentage, which causes IOR 234 to be in experimentation mode, as follows:

IOR 234 (in experimentation mode)
do nothing (0%-13% free)
do shrink space (7%-38% free)
do index rebuild (32% and above free)

As shown above, each range of condition metrics in IOR 234 (in experimentation mode) overlap by the identified experimentation percentage of 6%.

While IOR 234 is in experimentation mode with overlapping ranges of condition metrics, an index being analyzed for optimization, whose percentage of free space falls within an overlapping range (e.g., 7%-13% or 32%-38%), is randomly assigned one of the ILM options associated with one of the ranges in which the percentage of free space falls. Instance 216 records, in the HIID, at least information regarding the optimization of indexes whose condition metrics fall within multiple overlapping ranges. The information in the HIID provides data points needed to evaluate whether the condition metric thresholds in IOR 234 should be adjusted within the tested ranges.

After gathering a pre-determined amount of data by the optimization tuning experiments, or after IOR 234 being in experimentation mode for a pre-determined amount of time, instance 216 analyzes the collected HIID to determine whether to adjust the condition metric ranges for IOR 234 as described in detail above.

Maintaining Multiple Index Optimization Rulesets Keyed on a Key Index Attribute

According to an embodiment, instance 216 maintains a set of multiple IORs, where a set of multiple IORs is keyed to a key index attribute indicated in qualifier conditions associated with the set of IORs. Maintenance of multiple IORs is useful when an attribute of an index, (such as the size of an index, the type of data stored in an index, the volatility of indexed data, etc.) affects how well particular ILM approaches work for the indexes at different percentages of a condition metric, such as free space. In illustrations herein, free space is used as an illustrative example condition metric, but other condition metrics may be used.

Each IOR in a set of multiple IORs is associated with a qualifier condition based on the key index attribute, by which instance 216 may determine whether the IOR is applicable to a given index. When instance 216 maintains one or more sets of multiple IORs, before selecting an ILM approach for an index based on the condition metric determined for the index, instance 216 selects an applicable IOR for the index based on the value of the key index attribute for the index. For example, instance 216 maintains, in database data 230, a set of IORs that are keyed on the key index attribute of index size. The set of IORs includes an IOR 234A with a qualifier condition of (index size<=500 MB), and an IOR 234B with a qualifier condition of (index size>500 MB). The qualifier conditions of the set of IORs are mutually-exclusive and cover the entire range of possible key index attribute values, which facilitates selection of a particular IOR for any given index based on the value, for the index, of the key index attribute.

According to an embodiment, instance 216 automatically generates a set of multiple IORs as a result of automatically tuning an existing IOR, e.g., based on a parameter of an instruction to automatically tune the existing IOR that allows generation of multiple IORs from the existing IOR. The instruction to automatically tune the existing IOR may include further additional parameters regarding generation of multiple IORs, including a number of IORs allowed to be generated, a key index attribute for the multiple IORs, etc. If such information is not included in the instruction, instance 216 automatically determines the required parameters, e.g., based on analysis of the HIID or based on default values.

As an example to illustrate construction of a set of multiple IORs, instance 216 executes an instruction to automatically tune IOR 234 that allows construction of up to two IORs from IOR 234 based on the key index attribute of size. At the time of automatically tuning IOR 234, it is not associated with a qualifier condition or a key index attribute. Upon analyzing an HIID, instance 216 determines that optimal condition metric threshold percentages are different for indexes that have larger sizes when compared with threshold percentages that are optimal for indexes with smaller sizes. Based on this determination, instance 216 determines to generate multiple IORs from IOR 234. It is noted that instance 216 may determine, from analysis of the HIID, that a single IOR is sufficient, in which case a set of multiple IORs is not generated in connection with the instruction to automatically tune IOR 234, even if the instruction allows for construction of multiple IORs.

Continuing with the illustration of construction of a set of multiple IORs from IOR 234, instance 216 determines, from the HIID, that, for indexes that are over 500 megabytes (MB) in size and that have 33% or more free space upon implementation of an ILM option, it is less optimal (in terms of time, processing power, etc.) to perform a shrink space operation on than it is to rebuild the indexes. However, for indexes that are 500 MB or less, the indexes that have 38% or less free space upon optimization, it is more optimal to perform shrink space than it is to rebuild the indexes.

Accordingly, instance 216 creates an IOR 234A to apply to indexes that are 500 MB or less in size, and an IOR 234B to apply to indexes that are over 500 MB in size as follows:

IOR 234A (index_size<=500 MB)
do nothing (0%-10% free)
do shrink space (11%-38% free)
do index rebuild (39% and above free)
IOR 234B (index_size>500 MB)
do nothing (0%-10% free)
do shrink (11%-32% free)
do rebuild (33% and above free)

After creation of the set of IORs 234A and 234B, instance 216 identifies a particular IOR, based on which to select an ILM option for a given index, based on a value, for the index, of the key index attribute for the set of IORs. For the above example set of IORs, if an index has a size that is less than or equal to 500 MB, instance 216 applies IOR 234A, and if an index has a size that is greater than 500 MB, instance 216 applies IOR 234B.

For example, instance 216 determines to evaluate index 100 for optimization when instance 216 maintains the set of multiple IORS 234A and 234B, indicated above, and index 100 has a size of 400 MB. In connection with determining to evaluate index 100 for optimization, instance 216 evaluates statistical data for a sample of blocks of index 100 to determine a condition metric for index 100. The resulting condition metric for index 100 is 34% free space.

Instance 216 determines that IOR 234A is the IOR that is applicable to index 100 based on index 100 having a size of 400 MB, which satisfies the qualifier condition of 234A, i.e., (index_size<=500 MB). Based on IOR 234A, instance 216 selects a shrink space operation as the ILM option to implement for index 100, which is the ILM option that maps to the condition metric range that includes 34% free space in IOR 234A. Accordingly, instance 216 implements a shrink space operation for index 100, which coalesces the blocks of the index and then returns any freed data blocks to the tablespace for the index segment of index 100.

As a further illustration, instance 216 again determines to optimize index 100 when the index has a size of 600 MB and while instance 216 continues to maintain IORs 234A and 234B above. Based on analysis of a sample of data blocks in index 100, instance 216 again determines that index 100 has a condition metric of 34% free space. Based on the size of index 100 at this time, instance 216 identifies IOR 234B as the IOR that is applicable to the index. Based on IOR 234B, instance 216 selects index rebuild as the action to implement for optimizing index 100, which is the ILM option that maps to the condition metric range that includes 34% free space in IOR 234B. Accordingly, instance 216 implements an index rebuild operation for index 100, which completely rebuilds the index, thereby effectively releasing any unneeded data blocks to the tablespace.

According to an embodiment, a user may instruct DBMS 200 to automatically tune a set of IORs, in which case, automatically tuning the set of IORs may result in the same number of IORs with different qualifier conditions, or may result in a set with a different number of IORs (such as one more or less than the original number of IORs in the set). For example, instance 216 executes an instruction to automatically tune IORs 234A and 234B, indicated above. Based on analysis of an HIID, instance 216 generates a revised set of IORs comprising IOR 234A and IOR 234B, where the qualifier condition for IOR 234A is (index_size<=1 gigabyte (GB)), and the qualifier condition for IOR 234B is (index_size>1 GB). In this case, the condition metric thresholds for the revised set of IORs may or may not be adjusted based on the HIID analysis.

Background Policy Evaluator

According to an embodiment, instance 216 determines to evaluate index 100 for optimization based on determining that an ISILM policy, for index 100, is met. According to an embodiment, database server instance 216 is associated with a background policy evaluator that periodically monitors one or more indexes in database data 230, which are associated with ISILM policies, to identify when any of these ISILM policies are met.

To illustrate, the background policy evaluator, at time T1, initiates an evaluation of the ISILM policy set for index 100, which is met when there have been zero write accesses to index 100 in the last 10 days. Such evaluation may occur at a default periodic interval, or daily, or by a custom schedule. Thus, T1 indicates a time when the periodic interval or the custom schedule is triggered.

At time T1, the background policy evaluator evaluates the index-test requirement of the ISILM policy for index 100, which is based on access statistics. Access statistics for index 100 may be derived from stored statistics recorded over time by DBMS 200. Some portion of the access statistics for index 100 may be derived by using a segment level or block level heatmap of database data 230, i.e., for index 100, or for table 232 that is indexed by index 100. A segment level or block level heatmap of database data 230 may indicate activity such as: a last accessed time, a last modified time, a creation time for data blocks or segments within database data 230, etc.

For example, access statistics determined for index 100 indicate that there were 10 read-type row accesses for index 100, and 0 DML statements that modified the index. Since the ISILM policy for index 100 specifies a minimum time period of 10 days, the access statistics for index 100 are generated for a reporting period of the last 10 days prior to time T1. Thus, according to an embodiment, even if the background policy evaluator is invoked on a periodic daily basis, evaluation of the ISILM policy for index 100 is postponed until at least 10 days of access statistics are gathered.

Database Systems

Embodiments of the present invention are used in the context of DBMSs. Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data. A tablespace is a database storage unit that groups related logical structures together, and contains one or more physical data files. These logical structures include segments, which are allocations of space for a specific database object such as a table, or an index. A segment may be contained in one data file or may span across multiple data files.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language (DDL) instructions are issued to a DBMS to define database structures such as tables, views, or complex data types. For instance, CREATE, ALTER, DROP, and RENAME, are common examples of DDL instructions found in some SQL implementations. SQL data manipulation language (DML) instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Example Database Management System Configuration

A database client, not depicted in FIG. 2, connects to DBMS 200. The client may comprise a database application running on a client computing device. The client interacts with an instance of DBMS 200, such as instance 216, by submitting commands that cause the instance to perform operations on data stored in the database. For example, a command may be a request to access or modify data from the database, perform operations on the data, and/or return the data to the client.

DBMS 200 may be implemented by a single machine, e.g., device 210, or may be implemented by multiple machines that are communicatively connected. Referring to FIG. 2, database server instance 216, running on device 210, maintains database data 230 in persistent storage 220. According to an embodiment, device 210 may be referred to as a machine node, and runs database server instance 216.

A database server instance (or "instance") is a server that comprises a combination of the software and allocation of resources from a machine node. Specifically, a server, such as a database server, or any other process or application is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function, e.g., on behalf of one or more clients. In the embodiment depicted in FIG. 2, instance 216 implements server-side functions of DBMS 200.

Database data 230 may reside in volatile and/or non-volatile storage, such as memory 212, persistent storage 220, etc. According to an embodiment, memory 212 is byte-addressable memory, e.g., random-access memory, or persistent memory (PMEM), which is solid-state byte-addressable memory. Each machine node implementing DBMS 200 may include a virtual disk and/or a set of physical disks. Additionally, or alternatively, database data 230 may be stored, at least in part, in main memory of a database server computing device.

One or more of the functions attributed to any process described herein, may be performed by any other logical entity that may or may not be depicted in FIG. 2, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining, by a database management system that includes a processor, an index that (a) is associated with a table and (b) is allocated a plurality of data blocks, in which index data for the table is stored;
   maintaining, by the database management system, an index optimization ruleset that comprises a plurality of index management options and one or more condition metric thresholds;
   the database management system determining to analyze the index for optimization;
   in response to said determining to analyze the index for optimization, the database management system automatically:
      while the index is configured to allow index requests, analyzing one or more data blocks, of the plurality of data blocks, to generate a condition metric for the index;
      selecting, based on the generated condition metric for the index and the one or more condition metric thresholds, an index management option, of the plurality of index management options, to be implemented for the index; and
      implementing, within the database management system, the selected index management option on the index;
   wherein the method is performed by one or more computing devices.

2. The computer-executed method of claim 1, wherein the one or more data blocks comprise less than all of the plurality of data blocks.

3. The computer-executed method of claim 1, wherein said analyzing the one or more data blocks, of the plurality of data blocks, to generate the condition metric for the index comprises:
   determining a sample percentage of free space within the one or more data blocks; and
   estimating an index-wide percentage of free space, within the plurality of data blocks, based upon the determined sample percentage of free space;
   wherein the condition metric reflects the estimated index-wide percentage of free space.

4. The computer-executed method of claim 1, wherein the plurality of index management options comprises two or more of: (a) an index rebuild action, (b) an index shrink action, (c) an index coalesce action, and (d) a no-action option.

5. The computer-executed method of claim 4, wherein said selected index management option, to be implemented for the index, is the no-action option.

6. The computer-executed method of claim 1, wherein:
   the one or more condition metric thresholds define an ordered plurality of condition metric ranges;
   each index management option, of the plurality of index management options, is associated with a cost valuation;
   a lowest condition metric range, of the ordered plurality of condition metric ranges, is associated with a lowest-cost valuation index management option of the plurality of index management options; and
   a highest condition metric range, of the ordered plurality of condition metric ranges, is associated with a highest-cost valuation index management option of the plurality of index management options.

7. The computer-executed method of claim 6, wherein the lowest-cost valuation index management option is a no-action option and the highest-cost valuation index management option comprises an index rebuild action.

8. The method of claim 7, wherein an intermediate condition metric range, of the ordered plurality of condition metric ranges, is associated with an intermediate-cost valuation index management option comprising a shrink-space action.

9. The computer-executed method of claim 1, further comprising, after implementing, within the database management system, the selected index management option on the index, automatically adjusting at least one condition metric threshold of the one or more condition metric thresholds based, at least in part, on historical index management data.

10. The computer-executed method of claim 9, wherein:
   each index management option, of the plurality of index management options, is associated with a range of condition metric values based, at least in part, on the one or more condition metric thresholds; and
   the method further comprises performing an optimization tuning experiment comprising:

modifying ranges, associated with the plurality of index management options, to overlap by an experimentation amount;
after modifying the ranges, determining to analyze, for optimization, a second index maintained by the database management system;
in response to said determining to analyze the second index for optimization:
determining a second condition metric for the second index,
wherein the second condition metric falls within two overlapping ranges of condition metric values associated with two index management options of the plurality of index management options,
randomly selecting a particular index management option of the two index management options to be implemented for the second index,
implementing the particular index management option on the second index, and
recording, in the historical index management data, information regarding said implementing the particular index management option on the second index.

11. The computer-executed method of claim 10, wherein the information regarding said implementing the particular index management option on the second index comprises one or more of:
the particular index management option;
a percentage of free space in the second index before implementing the particular index management option;
a percentage of free space in the second index after implementing the particular index management option;
an amount of time the particular index management option took to implement;
a measure of processing power that the particular index management option took to implement;
a size of the second index before implementing the particular index management option;
a size of the second index after implementing the particular index management option;
a type of the second index;
a type of data stored in the second index; or
a measure of volatility of the second index.

12. The computer-executed method of claim 1, further comprising:
wherein the index is associated with a management policy that comprises a test requirement and a time requirement;
determining whether the management policy, for the index, has been met based on the test requirement and the time requirement;
wherein said determining to analyze the index for optimization is based on determining that the management policy, for the index, has been met.

13. The computer-executed method of claim 1, wherein the index optimization ruleset is a first index optimization ruleset of a plurality of index optimization rulesets, the method further comprising:
maintaining, by the database management system, a second index optimization ruleset, of the plurality of index optimization rulesets;
wherein the first index optimization ruleset is associated with a first qualifier condition that is based on a particular index attribute;
wherein the second index optimization ruleset is associated with a second qualifier condition that is based on the particular index attribute;

prior to said selecting the index management option to be implemented for the index, selecting the first index optimization ruleset, of the plurality of index optimization rulesets, based on a value of the particular index attribute, for the index, satisfying the first qualifier condition associated with the first index optimization ruleset;
wherein said selecting the index management option based, in part, on the one or more condition metric thresholds of the first index optimization ruleset is based on said selecting the first index optimization ruleset.

14. One or more non-transitory computer-readable media storing one or more sequences of instructions that, when executed by one or more processors, cause:
maintaining, by a database management system, an index that (a) is associated with a table and (b) is allocated a plurality of data blocks, in which index data for the table is stored;
maintaining, by the database management system, an index optimization ruleset that comprises a plurality of index management options and one or more condition metric thresholds;
the database management system determining to analyze the index for optimization;
in response to said determining to analyze the index for optimization, the database management system automatically:
while the index is configured to allow index requests, analyzing one or more data blocks, of the plurality of data blocks, to generate a condition metric for the index;
selecting, based on the generated condition metric for the index and the one or more condition metric thresholds, an index management option, of the plurality of index management options, to be implemented for the index; and
implementing, within the database management system, the selected index management option on the index.

15. The one or more non-transitory computer-readable media of claim 14, wherein the one or more data blocks comprise less than all of the plurality of data blocks.

16. The one or more non-transitory computer-readable media of claim 14, wherein said analyzing the one or more data blocks, of the plurality of data blocks, to generate the condition metric for the index comprises:
determining a sample percentage of free space within the one or more data blocks; and
estimating an index-wide percentage of free space, within the plurality of data blocks, based upon the determined sample percentage of free space;
wherein the condition metric reflects the estimated index-wide percentage of free space.

17. The one or more non-transitory computer-readable media of claim 14, wherein the plurality of index management options comprises two or more of: (a) an index rebuild action, (b) an index shrink action, (c) an index coalesce action, and (d) a no-action option.

18. The one or more non-transitory computer-readable media of claim 17, wherein said selected index management option, to be implemented for the index, is the no-action option.

19. The one or more non-transitory computer-readable media of claim 14, wherein:
the one or more condition metric thresholds define an ordered plurality of condition metric ranges;

each index management option, of the plurality of index management options, is associated with a cost valuation;

a lowest condition metric range, of the ordered plurality of condition metric ranges, is associated with a lowest-cost valuation index management option of the plurality of index management options; and a highest condition metric range, of the ordered plurality of condition metric ranges, is associated with a highest-cost valuation index management option of the plurality of index management options.

20. The one or more non-transitory computer-readable media of claim 19, wherein the lowest-cost valuation index management option is a no-action option and the highest-cost valuation index management option comprises an index rebuild action.

21. The one or more non-transitory computer-readable media of claim 20, wherein an intermediate condition metric range, of the ordered plurality of condition metric ranges, is associated with an intermediate-cost valuation index management option comprising a shrink-space action.

22. The one or more non-transitory computer-readable media of claim 14, wherein the one or more sequences of instructions further comprise instructions that, when executed by one or more processors, cause, after implementing, within the database management system, the selected index management option on the index, automatically adjusting at least one condition metric threshold of the one or more condition metric thresholds based, at least in part, on historical index management data.

23. The one or more non-transitory computer-readable media of claim 22, wherein:
    each index management option, of the plurality of index management options, is associated with a range of condition metric values based, at least in part, on the one or more condition metric thresholds; and
    the one or more sequences of instructions further comprise instructions that, when executed by one or more processors, cause performing an optimization tuning experiment comprising:
        modifying ranges, associated with the plurality of index management options, to overlap by an experimentation amount;
        after modifying the ranges, determining to analyze, for optimization, a second index maintained by the database management system;
        in response to said determining to analyze the second index for optimization:
            determining a second condition metric for the second index,
            wherein the second condition metric falls within two overlapping ranges of condition metric values associated with two index management options of the plurality of index management options,
            randomly selecting a particular index management option of the two index management options to be implemented for the second index,
            implementing the particular index management option on the second index, and
            recording, in the historical index management data, information regarding said implementing the particular index management option on the second index.

24. The one or more non-transitory computer-readable media of claim 23, wherein the information regarding said implementing the particular index management option on the second index comprises one or more of:
    the particular index management option;
    a percentage of free space in the second index before implementing the particular index management option;
    a percentage of free space in the second index after implementing the particular index management option;
    an amount of time the particular index management option took to implement;
    a measure of processing power that the particular index management option took to implement;
    a size of the second index before implementing the particular index management option;
    a size of the second index after implementing the particular index management option;
    a type of the second index;
    a type of data stored in the second index; or
    a measure of volatility of the second index.

25. The one or more non-transitory computer-readable media of claim 14, wherein the one or more sequences of instructions further comprise instructions that, when executed by one or more processors, cause:
    wherein the index is associated with a management policy that comprises a test requirement and a time requirement;
    determining whether the management policy, for the index, has been met based on the test requirement and the time requirement;
    wherein said determining to analyze the index for optimization is based on determining that the management policy, for the index, has been met.

26. The one or more non-transitory computer-readable media of claim 14, wherein:
    the index optimization ruleset is a first index optimization ruleset of a plurality of index optimization rulesets; and
    wherein the one or more sequences of instructions further comprise instructions that, when executed by one or more processors, cause:
        maintaining, by the database management system, a second index optimization ruleset, of the plurality of index optimization rulesets,
        wherein the first index optimization ruleset is associated with a first qualifier condition that is based on a particular index attribute,
        wherein the second index optimization ruleset is associated with a second qualifier condition that is based on the particular index attribute,
        prior to said selecting the index management option to be implemented for the index, selecting the first index optimization ruleset, of the plurality of index optimization rulesets, based on a value of the particular index attribute, for the index, satisfying the first qualifier condition associated with the first index optimization ruleset, and
        wherein said selecting the index management option based, in part, on the one or more condition metric thresholds of the first index optimization ruleset is based on said selecting the first index optimization ruleset.

* * * * *